United States Patent
Kobayashi et al.

(10) Patent No.: US 8,343,375 B2
(45) Date of Patent: Jan. 1, 2013

(54) FERRITE POWDER AND ITS PRODUCTION METHOD

(75) Inventors: Nobuyuki Kobayashi, Nagoya (JP); Shuichi Ozawa, Nagoya (JP); Kei Sato, Tokai (JP)

(73) Assignee: NGK Insulators, Ltd., Nagoya (JP)

( * ) Notice: Subject to any disclaimer, the term of this patent is extended or adjusted under 35 U.S.C. 154(b) by 414 days.

(21) Appl. No.: 12/607,207

(22) Filed: Oct. 28, 2009

(65) Prior Publication Data

US 2010/0127423 A1  May 27, 2010

Related U.S. Application Data

(60) Provisional application No. 61/158,033, filed on Mar. 6, 2009.

(30) Foreign Application Priority Data

Oct. 29, 2008 (JP) ................................. 2008-278661

(51) Int. Cl.
*H01F 17/00* (2006.01)
*H01F 41/04* (2006.01)
*C04B 35/26* (2006.01)

(52) U.S. Cl. ............... 252/62.6; 252/62.62; 264/272.19

(58) Field of Classification Search .... 252/62.56–62.64; 264/272.19
See application file for complete search history.

(56) References Cited

U.S. PATENT DOCUMENTS 6,187,218 B1 * 2/2001 Kodama et al. ............. 252/62.6

FOREIGN PATENT DOCUMENTS

| EP | 1 219 577 A2 | 7/2002 |
| JP | 11-121234 | 4/1999 |
| JP | 11-345731 | 12/1999 |

OTHER PUBLICATIONS

Kim et al., "*A Study of Synthesis of NiCuZn-Ferrite Sintering in Low Temperature by Metal Nitrates and its Electromagnetic Property*," Journal of Magnetism and Magnetic Materials, Elsevier Science Publishers, Amsterdam, NL, vol. 257, No. 2-3, Feb. 1, 2003, pp. 355-368.

* cited by examiner

*Primary Examiner* — Carol M Koslow
(74) *Attorney, Agent, or Firm* — Burr & Brown

(57) ABSTRACT

A ferrite powder for producing a ferrite sintered body is provided, the ferrite powder having a median diameter $D_{50}$ [μm] in a range from 0.1 to 0.8 μm, a degree of spinel formation in a range from 45 to 90%, and a remanent magnetization Br per unit mass [emu/g] satisfying the following formula after application of the maximum magnetic field of 15 kOe: $0.05 \leq Br \leq 2.0(\ln.D_{50})+6.3$. This ferrite powder produces a homogeneous ferrite sintered body having very few cracks by gel casting.

4 Claims, 12 Drawing Sheets

COATING OF RELEASE AGENT → PRINTING OF CONDUCTOR → MOLD ASSEMBLING

FORMING → LAMINATING

FERRITE POWDER AND ITS PRODUCTION METHOD

FIELD OF THE INVENTION AND RELATED BACKGROUND OF THE INVENTION

The present invention relates to a ferrite powder suitable for forming thereof by the gel-cast method, and to a method for producing same.

BACKGROUND OF THE INVENTION

Mobile devices such as cellphones enhanced the trend of weight-reduction and functional multiplication, thus they have become essential tools in everyday living. Accordingly, the electric and electronic components of these mobile devices progress in their development focusing on the technological targets of reduction in size, reduction in thickness, reduction in power-consumption, and of increase in the operating speed. These mobile devices are base parts along with resistors and capacitors. The development trend is the same in power inductors applied to voltage-conversion circuits.

The power inductors are grouped into the coil type, the thin-film type, and the laminated type depending on the structure. Many of them have a core of ferrite and a conductor in spiral shape. The performances requested to the power inductors in electric and electronic circuits of mobile devices are small in size, small in thickness, and low resistance (low loss), based on the above technological subjects relating to the mobile devices. To satisfy the small size and small thickness and the low resistance (low loss) at a time, it is required to thicken the conductor (or to increase the cross sectional area of the conductor) while decreasing the distance between the conductors.

There is a known method for producing power inductor having increased thickness (increased cross sectional area) of the conductor and having decreased distance between the conductors. The method is to harden the peripheral area of the conductor worked into spiral shape by ferrite in advance. The existed documents of that kind of means to produce the inductor include Patent Document 1 (Japanese Patent Laid-Open No. 11-121234) and Patent Document 2 (Japanese Patent Laid-Open No. 11-345731). These patent documents disclose the method for producing inductor using gel casting.

Gel casting is generally a method for producing form by the steps of: pouring a slurry containing a powder such as metal powder and ceramic powder, a dispersion medium, and a gelator into a mold; gelling the slurry under a certain temperature condition or by adding a cross-linking agent or the like, thus solidifying the slurry to obtain the green body (molded body). Gel-casting method induces very little hardening shrinkage and drying shrinkage, and attains fine green body at high accuracy reproducing the precise shape of the mold, thus easily produces the form containing a spiral conductor in a precise pattern. Accordingly, gel casting method is a suitable means to produce power inductor on this point of view.

SUMMARY OF THE INVENTION

On producing power inductor by gel casting, however, if the ferrite slurry as the core material of the power inductor is not a suitable one, there arises a problem that cracks are likely generated in the sintered ferrite body (power inductor) obtained by firing the green body prepared by gel casting, thus the production yield decrease.

To this point, there have been conducted detailed studies and investigations. The studies revealed that since the dispersion state of powders in the slurry of gel casting directly reflects on the microstructure of the form, obtaining a form with good sinterability needs the atomization of powder grains in the slurry and the increasing the powder concentration in the slurry (high packing ratio). It is therefore speculated that when these needs are satisfied, the flowability of slurry decreases and the formability deteriorates, thus likely generating cracks after firing.

For instance, a preferred power inductor is the one structured by a Ni—Zn—Cu-based ferrite sintered body containing a spiral Ag-conductor. To produce the power inductor, it is necessary to sinter a ferrite having a single phase composition and having 100 or larger relative magnetic permeability. To do this, it is preferable that the grain diameter (median diameter, 50% diameter) of the ferrite powder is decreased while increasing the slurry concentration to improve the sinterability of the ferrite because poor sinterability decreases the sinter density to raise a problem of decreasing in the relative magnetic permeability.

When, however, the slurry is prepared using a powder having that small median diameter, the slurry viscosity increases to 10000 cps or larger, resulting in poor flowability and faulty pouring of the slurry into the mold to worsen the formability. For pouring the slurry into a mold, the slurry viscosity is required to have at least 3000 cps or smaller, preferably 1000 cps or smaller.

That is, on producing a ferrite sintered body (power inductor) by gel casting, a critical key is the preparation of the ferrite slurry having both the sinterability and the formability. FIG. 4 is a graph showing the relationship between the concentration of ferrite powder and the slurry viscosity in a ferrite slurry. For reference, FIG. 4 also shows the relationship between the powder concentration and the slurry viscosity for the cases of a dielectric material and of alumina. As seen in FIG. 4, specifically the ferrite is a material of extremely small dispersibility, giving several tens of times the viscosity of the slurry of dielectric body having the same powder concentration (vol. %), and one hundred times or more thereof of the slurry of alumina. Consequently, obtaining a ferrite slurry having both the sinterability and the formability is a very difficult work.

The present invention has been derived to solve the above problems of related art, and an object of the present invention is to provide a ferrite slurry having both the sinterability and the formability, and to provide a means to obtain a homogeneous ferrite sintered body (power inductor) generating very few cracks, by gel casting. Studies revealed that these problems can be solved by using a ferrite powder specified by the median diameter, the degree of spinel formation, and the remanent magnetization, (physical quantities), thus perfected the present invention.

According to the present invention, there is provided a ferrite powder having a median diameter $D_{50}$ [μm] in a range from 0.1 to 0.8 μm, a degree of spinel formation in a range from 45 to 90%, and a remanent magnetization Br per unit mass [emu/g] satisfying the following formula after application of the maximum magnetic field of 15 kOe:

$$0.05 \leq Br \leq 2.0(\ln. D_{50})+6.3$$

(ln. is natural logarithm).

Regarding the ferrite powder of the present invention, the degree of spinel formation is preferably in a range from 60 to 85%.

The degree of spinel formation Sc [%] referred to herein is expressed by the following formula:

$$Sc = Isp220/(IFe104 + Isp220) \times 100$$

where, Isp220 is the integrated intensity of spinel 220 diffraction and IFe104 is the integrated intensity of $Fe_3O_4$ 104 diffraction in the pattern obtained by X-ray diffractometry.

As for the ferrite powder of the present invention, the remanent magnetization Br [emu/g] further preferably satisfies the formula:

$$0.50 \leq Br \leq 1.7(\ln D_{50}) + 4.2$$

For the ferrite powder of the present invention, it is preferable that one or more metal oxide of Ni (nickel) oxide, Zn (zinc) oxide, and Cu (copper) oxide is contained therein. For example, it is preferable that one or more of NiO, ZnO, and CuO is contained. A system including metal oxides of Ni oxide, Zn oxide, and Cu oxide is called the Ni—Zn—Cu-based system. That is, the ferrite powder of the present invention is preferably a Ni—Zn—Cu-based ferrite powder.

Generally speaking, if the mass of the powder at a certain volume is the same (density is the same), and if the shape of the powder is not varied, then decreased grain size increases the surface area. The ferrite powder of the present invention having the median diameter $D_{50}$ in a range from 0.1 to 0.8 µm is equivalent to have the specific surface area S in a range from 4.0 to 14.0 $m^2/g$.

Next, the present invention provides a ferrite slurry containing any of above-given ferrite powders. The ferrite slurry of the present invention is preferably a Ni—Zn—Cu-based slurry.

The ferrite slurry of the present invention preferably has a concentration of the ferrite powder ranging from 35 to 60% by volume, preferably has the viscosity (as the slurry) ranging from 50 to 3000 cps, and preferably is able to be used in gel casting. More preferred viscosity is 1000 cps or smaller.

Next, the present invention provides a method for producing ferrite powder comprising the steps of: calcining (heat-treating) a powder containing a main raw material having $Fe_2O_3$ (iron(III) oxide) and a metal oxide of at least one of Ni oxide, Zn oxide, and Cu oxide at a temperature lower by 30° C. to 200° C. than the temperature of generating a ferrite single phase (ferrite single-phasing temperature), thus preparing a calcined powder; and milling the calcined powder.

In the method for producing ferrite powder of the present invention, it is more preferable that the temperature at calcination is lower by 50° C. to 130° C. than the temperature of generating a ferrite single phase.

The method for producing ferrite powder according to the present invention corresponds to a method for producing the ferrite powder according to the present invention. The temperature to form the ferrite single phase is the temperature at which all components react to become ferrite, or the temperature at which no unreacted substance is left behind. The temperature of generating the ferrite single phase is approximately in a range from 800° C. to 850° C., though the temperature differs with the composition of powder containing a main raw material having $Fe_2O_3$ (iron(III)oxide) and a metal oxide of at least one of Ni oxide, Zn oxide, and Cu oxide.

At temperatures lower than the temperature of generating the ferrite single phase, not all the components react to become the ferrite, and unreacted substances are left behind. If the powder is calcined at a temperature of lower than 30° C. below the temperature of generating the ferrite single phase, the quantity of unreacted substances becomes small, and the magnetism of the powder increases. As a result, the viscosity of ferrite slurry becomes 3000 cps or larger. On the other hand, when the powder is calcined at a temperature lower than 200° C. below the temperature of generating the ferrite single phase, the quantity of unreacted substances increases to worsen the sinterability and significantly deteriorates the relative magnetic permeability, though the viscosity of ferrite slurry decreases. If, however, calcination is conducted at temperatures lower by 30° C. to 200° C. than the temperature of generating the ferrite single phase (or the temperatures lower by 30° C. to 200° C. than the basis temperature of generating the ferrite single phase), that problem can be avoided, and the viscosity of ferrite slurry becomes low to be applicable to gel casting, and further favorable sinterability is attained to produce a sintered body having high relative magnetic permeability. If the calcination is done at temperatures lower by 50° C. to 130° C. than the temperature of generating ferrite single phase, the viscosity of ferrite slurry becomes 1000 cps or smaller, thus obtaining a ferrite sintered body having further high relative magnetic permeability.

Next, the present invention provides a method for producing a ferrite sintered body by preparing any of the above ferrite powders produced by any of the above methods for producing ferrite powder, by using and processing the ferrite powder to form a ferrite slurry, by solidifying the ferrite slurry to obtain a form thereof, and then by firing the form at a temperature ranging from 850° C. to 1100° C.

Regarding the method for producing ferrite sintered body of the present invention, the relative magnetic permeability of the ferrite sintered body is preferably 80% or more of the relative magnetic permeability (typical value) of the ferrite single phase composition, and more preferably 90% or more thereof. That is, the method for producing ferrite sintered body of the present invention is a production method which makes the relative magnetic permeability of ferrite sintered body 80% or more, preferably 90% or more thereof, of the relative magnetic permeability (typical value) of the ferrite single phase composition.

Next, the present invention provides a method for producing inductor (the first method for producing inductor) by the steps of: placing a spiral conductor in a mold; preparing the ferrite powder by the method given above for producing ferrite powder, or preparing the ferrite powder by a method for producing the ferrite powder; preparing a ferrite slurry using and processing any of above ferrite powders; pouring the ferrite slurry into the mold; solidifying the poured ferrite slurry around the conductor to obtain a form; and firing the green body at a temperature ranging from 850° C. to 1100° C.

Next, the present invention provides a method for producing inductor (the second method for producing inductor) by the steps of: placing a conductor in a mold; preparing the ferrite powder by the method given above for producing ferrite powder, or preparing the ferrite powder by a method for producing the ferrite powder; preparing a ferrite slurry by using and processing any of above ferrite powders; pouring the ferrite slurry into the mold; solidifying the poured ferrite slurry around the conductor body to obtain pluralities of primary green bodies; laminating these pluralities of primary green bodies together to obtain a laminated green body with the conductor buried therein in a spiral shape; and firing the laminated green body at a temperature ranging from 850° C. to 1100° C. On being simply referred to as "the method for producing inductor according to the present invention", the term signifies both the first method for producing inductor and the second method for producing inductor.

Since the ferrite powder according to the present invention has a median diameter $D_{50}$ [µm] in a range from 0.1 to 0.8 µm, a degree of spinel formation in a range from 45 to 90%, and a remanent magnetization Br per unit mass [emu/g] satisfying the following formula after application of the maximum magnetic field of 15 kOe:

$$0.5 \leq Br \leq 2.0(\ln D_{50}) + 6.3$$

the ferrite powder has weak magnetism, though the grains of the powder are atomized, and the attraction force of powder grains in the slurry is weak, thus there generates no coagulation power. As a result, the ferrite powder according to the present invention provides a ferrite slurry having relatively small viscosity, such as 3000 cps or smaller, preferably 1000 cps or smaller, even if the slurry has superior dispersibility and is high concentration, compared with the ferrite slurry containing conventional ferrite powder. The ferrite sintered body produced from the ferrite powder of the present invention shows the relative magnetic permeability of 80% or larger, preferably 90% or larger, of the relative magnetic permeability (typical value) of the ferrite single phase composition.

As described above, the relative magnetic permeability of the ferrite sintered body produced from the ferrite powder of the present invention becomes 80% or larger, preferably 90% or larger, of the relative magnetic permeability (typical value) of the ferrite single phase composition. In this case, however, the relative density of the ferrite sintered body also increases to 90% or larger, preferably 95% or larger. The relative density and the relative magnetic permeability have a correlation therebetween. The term "relative density" referred to herein is defined by determining the density by the Archimedes method, then by expressing the ratio to the theoretical density by percentage.

As for the ferrite powder of the present invention, if the median diameter is smaller than 0.1 μm, the viscosity of slurry prepared from the ferrite powder becomes larger than 3000 cps, and the values are not preferable. If the median diameter exceeds 0.8 μm, the denseness (the relative density) of the ferrite sintered body prepared by solidifying and firing the slurry using the ferrite powder becomes insufficient, and furthermore the relative magnetic permeability of the ferrite sintered body becomes smaller than 80% of the relative magnetic permeability (typical value) of the ferrite single phase composition, which is not favorable.

The ferrite slurry according to the present invention contains the ferrite powder of the present invention, has excellent dispersibility, and has high concentration and low viscosity, thus the ferrite slurry shows excellent flowability, easily pours into the mold, and provides a green body of good sinterability. As a result, the ferrite slurry of the present invention provides a homogeneous ferrite sintered body generating very few cracks through forming and firing thereof. In particular, when the ferrite powder has a concentration of from 35 to 60% by volume and has a viscosity of from 50 to 3000 cps, preferably 1000 cps or smaller, gel casting can provide an excellent ferrite sintered body generating no cracks.

The method for producing ferrite powder according to the present invention provides a ferrite powder by: calcining a powder containing a main raw material having $Fe_2O_3$ and a metal oxide of at least one of Ni oxide, Zn oxide, and Cu oxide at a temperature lower by 30° C. to 200° C. than the temperature of generating a ferrite single phase, thus preparing a calcined powder; and then milling the calcined powder. As a result, the obtained ferrite powder contains unreacted substances, and shows small magnetism. That is, the method for producing ferrite powder according to the present invention is effective to produce the ferrite powder of the present invention.

The method for producing ferrite sintered body according to the present invention comprising the steps of: preparing the ferrite powder obtained by the method for producing ferrite powder of the present invention, (the ferrite powder of the present invention); preparing a ferrite slurry using and processing the ferrite powder; solidifying the ferrite slurry to obtain a green body; and firing the green body at a temperature ranging from 850° C. to 1100° C. to obtain the completely sintered ferrite sintered body. As a result, the obtained ferrite sintered body is homogeneous generating very few cracks, and has a relative magnetic permeability of 80% or more, preferably 90% or larger, of the relative magnetic permeability (typical value) of the ferrite single phase composition, which shows the intrinsic magnetism.

The first method for producing inductor according to the present invention comprises the steps of: placing a spiral conductor in a mold; preparing any of the ferrite powders of the present invention using any of the methods for producing ferrite powder of the present invention; preparing a ferrite slurry using and processing the ferrite powder; pouring the ferrite slurry into a mold; solidifying the poured ferrite slurry around the conductor to obtain a green body; and firing the green body at a temperature ranging from 850° C. to 1100° C. Consequently, there can be obtained an inductor having thick conductor, for example, 50 μm or larger, having narrow distance between conductors, for example, 10 μm or smaller, and being completely sintered to give the intrinsic magnetism. This is because the flowability of the ferrite slurry is favorable, thus the ferrite slurry is at a high concentration, and because the ferrite slurry can be filled around the conductors without gap therearound even when the distance between the spiral conductors is narrow. That type of inductor is suitable as a power inductor of small size, small thickness, and low resistance (low loss). The method for producing inductor of the present invention provides a power inductor with reduced resistance of material by 40% or more compared with that of conventional materials. Similar effect is attained even by the second method for producing inductor of the present invention.

DESCRIPTION OF THE INVENTION

Figure 1:
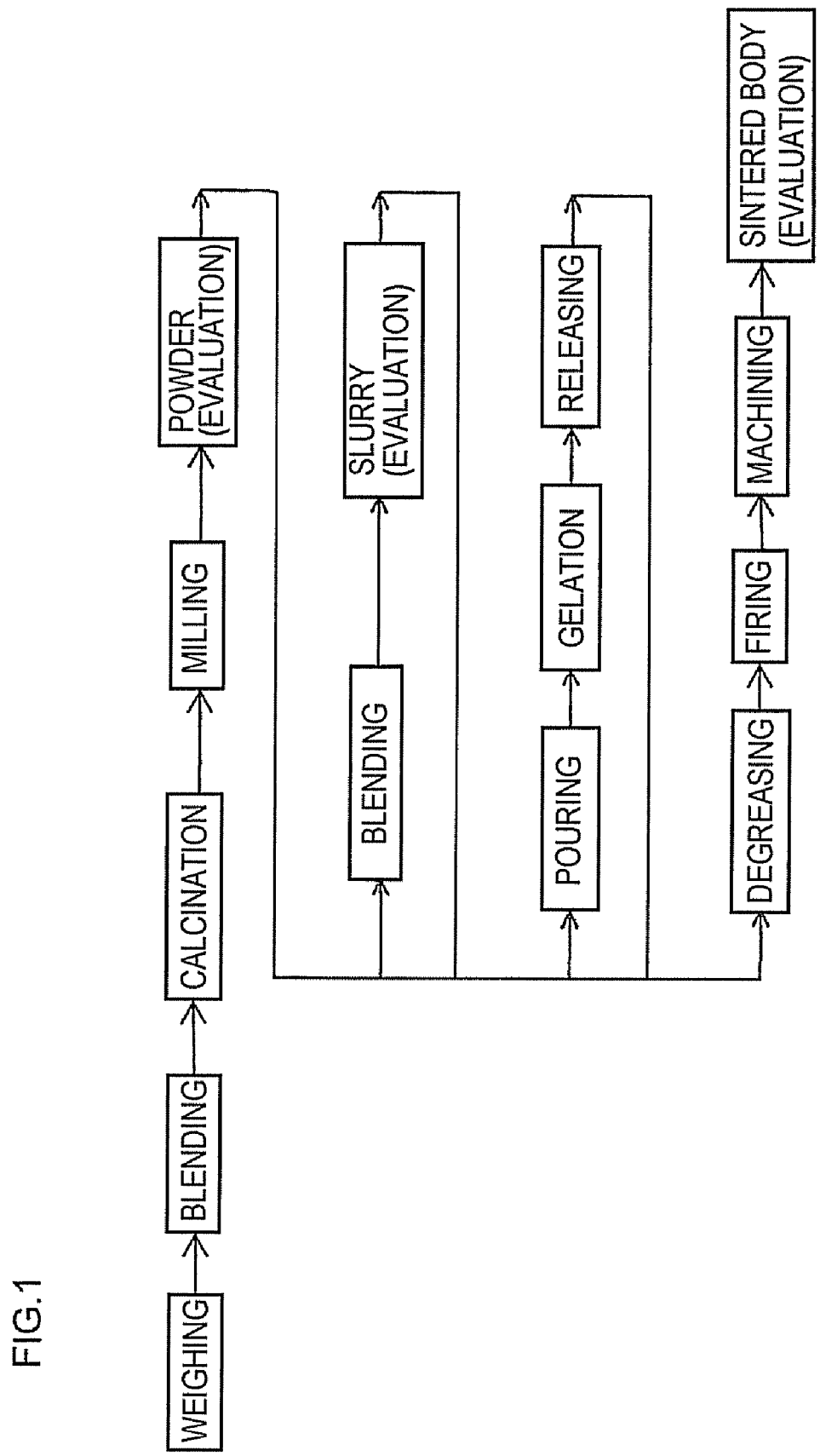
FIG. 1 illustrates a flow diagram of an embodiment of a method for producing ferrite sinter according to the present invention.

The embodiments of the present invention are described below referring to the drawings at need. The present invention is, however, not defined to limit the described embodiments, and it will be apparent to one skilled in the art that various changes, modifications, improvements, and substitutions can be made therein without departing from the spirit and scope thereof. For instance, although the drawings express preferable embodiments of the present invention, the present invention is not limited by the mode given in the drawings and by the information given in the drawings. On executing or validating the present invention, means similar to or equivalent to those described in this specification are applicable. Preferred means, however, are those described in the following.

The description begins with the method for producing ferrite sintered body according to the present invention referring to FIG. 1, through which description the method for producing ferrite powder, the ferrite powder and the ferrite slurry of the present invention are described.

(Preparation of ferrite powder) [Weighing] The raw material powders being able to structure ferrite are weighed to a desired blending ratio. The raw material is arbitrary if only it contains iron oxide and other metal oxide, and if it can structure the ferrite. Typical raw materials are $Fe_2O_3$, ZnO, NiO, and CuO. At this stage, the grain size and the like of the raw material powder are not specifically limited.

[Blending] The weighed raw material powders for ferrite are blended together. For example, wet blending by the ball-mill method prepares slurry of the raw material powders. In that case, pure water (ion-exchange water) is used as the dispersion medium. Once the slurry is prepared, it is preferable that the slurry is dried in a dryer and then sieved.

[Calcination] The blended raw material powders for ferrite are then calcined at a temperature lower by 50° C. to 200° C. than the ferrite single-phasing temperature. The calcination can be done using a firing furnace. The temperature increase and decrease rate may be approximately in a range from 100° C./h to 300° C./h, and the calcination time may be approximately from 1 to 3 hours.

[Milling] The calcined raw material powder for ferrite is milled to obtain a ferrite powder having a median diameter in a range from 0.1 to 2.0 µm. The milled method is similar to above blending method. For example, the wet milling is applied by the ball-mill method with pure water (ion-exchange water) as the dispersion medium, and the prepared slurry is dried in a dryer, followed by sieving thereof to obtain the powder having the desired median diameter.

Figure 2:
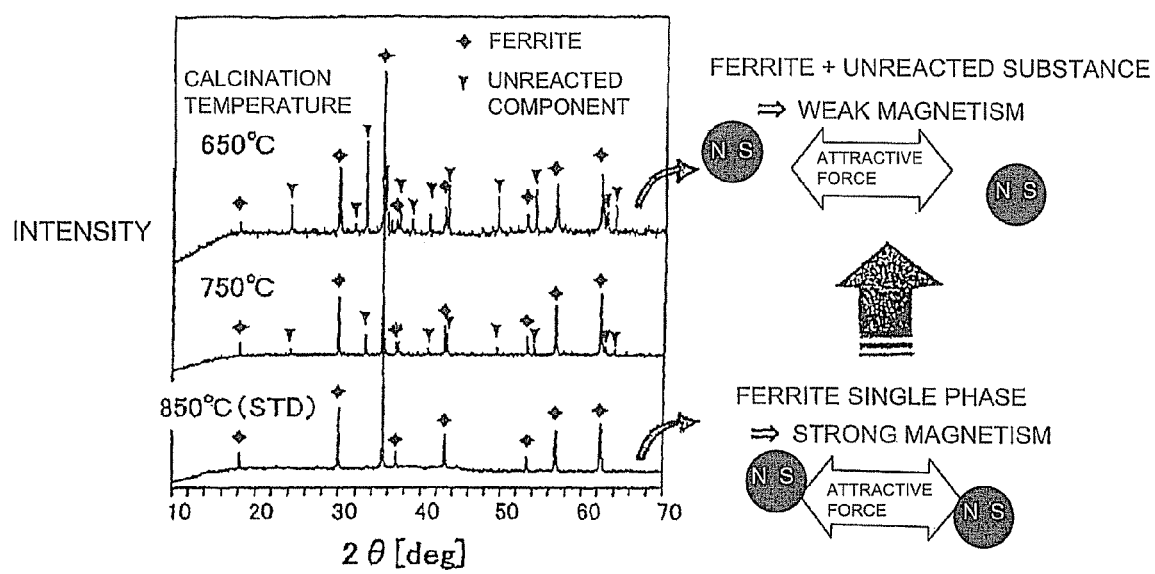
FIG. 2 illustrates XPD profiles of the ferrite powder, determined by an X-ray diffractometer.

[Evaluation of powder] The median diameter of the ferrite powder can be determined by a commercially available laser diffraction/scattering grain size distribution tester. With a commercially available X-ray diffractometer (XRD), the crystal phase is observed to determine the presence/absence of peak other than that of ferrite, thus it can be confirmed that unreacted substances are present and that the ferrite powder does not generating the ferrite single phase. The remanent magnetization per unit mass (the magnetization under 0 Oe of applied magnetic field) after the maximum applied magnetic field of 15 kOe can be determined by a commercially available vibrating sample magnetometer (VSM). FIG. 2 shows XRD profile of ferrite powder, determined by an X-ray diffractometer (RAD-IB, Rigaku Corporation) at ferrite powder calcination temperatures of 650° C., 750° C., and 850° C. FIG. 2 confirms that, if calcination is conducted at the ferrite single-phasing temperature of 850° C., (for example), entire ferrite-generation can be done, and if the calcination is conducted at 750° C. or 650° C., lower than the ferrite single-phasing temperature of 850° C., (for example), the unreacted substances are left behind.

(Preparation of ferrite slurry) [Blending] The obtained ferrite powder is blended with a dispersion medium and a dispersant to obtain a ferrite slurry having 35 to 60% by volume of the ferrite powder concentration and 50 to 3000 cps of the viscosity. The dispersion medium uses an organic substance being able to chemically bond with a gelator described later and being able to solidify the slurry. For example, preferred dispersion medium includes an ester having an ester bond, such as polybasic acid ester and acid ester of polyhydric alcohol, specifically an ester having two or more ester bonds.

Figure 3:
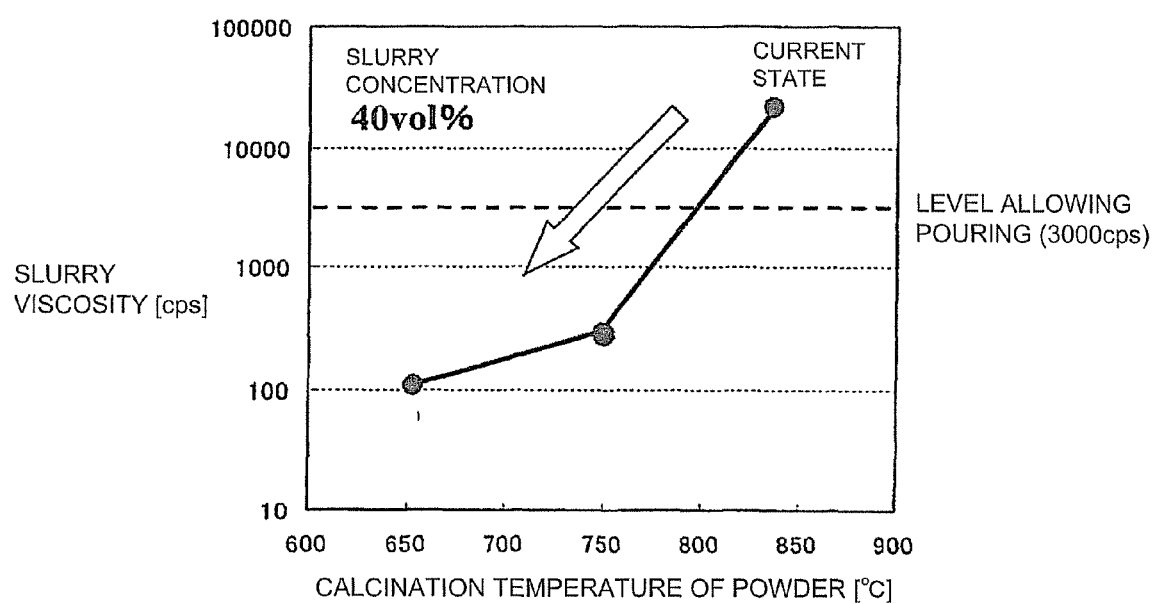
FIG. 3 is a graph showing the relationship between the calcination temperature of ferrite powder and the viscosity of ferrite slurry.
Figure 4:
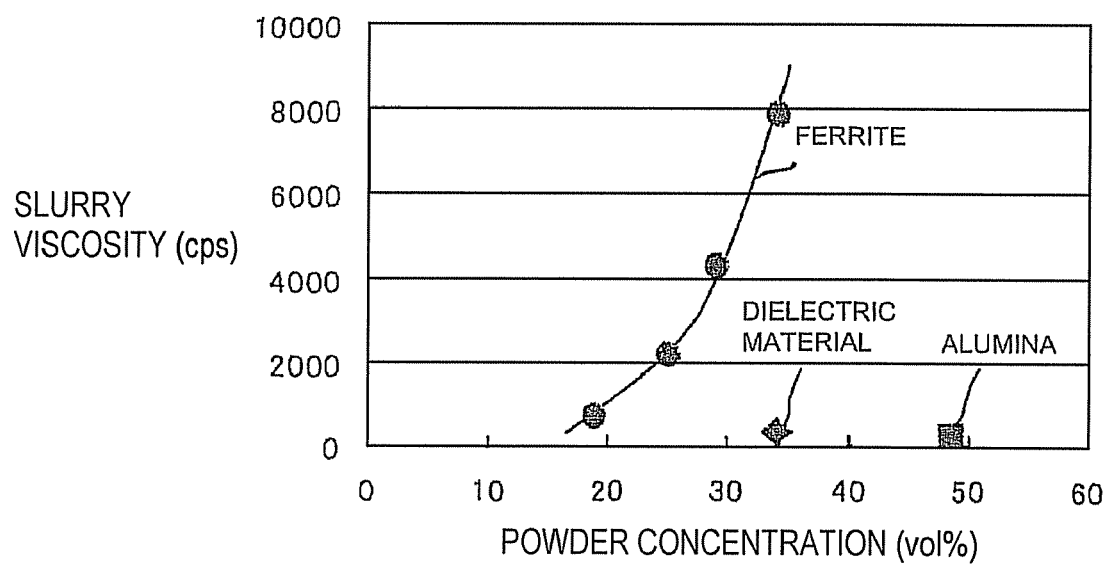
FIG. 4 is a graph showing the relationship between the powder concentration and the viscosity of ferrite slurry.

[Evaluation of slurry] The viscosity of ferrite slurry can be determined by a commercially available viscometer. FIG. 3 is a graph showing the relationship between the calcination temperature of the ferrite powder used for preparing the ferrite slurry and the viscosity of ferrite slurry at 40% by volume of ferrite powder concentration. FIG. 3 shows that, when the applied powder is the one calcined at the ferrite single-phasing temperature of 830° C., (for example), (current condition, or conventional condition), to convert entire powder into ferrite, the slurry viscosity reaches 10000 cps or larger. That viscosity exceeds the level allowing pouring, or 3000 cps. On the other hand, when the applied powder is the one calcined at lower temperature than the ferrite single-phasing temperature of 830° C., (for example), such as at 750° C. and 650° C., (conditions of the present invention), the slurry viscosity can be brought to 3000 cps or smaller, and further to 1000 cps or smaller.

[Preparation of Ferrite Sintered Body] [Pouring]

The obtained ferrite slurry is blended with a gelator, a catalyst, and a curing agent. The blended slurry is then poured into a mold. The mold has a coating of release agent thereon, and has a cavity of desired shape therein. The gelator is a substance being able to chemically bond with the dispersion medium and being able to solidify the ferrite slurry. The gelator preferably has isocyanate group (—N=C=O). That kind of gelator includes MDI(4,4-diphenylmethane diisocyanate)-based isocyanate (resin), HDI(hexamethylene diisocyanate)-based isocyanate (resin), TDI(tolylene diisocyanate)-based isocyanate (resin), IPDI(isophorone diisocyanate)-based isocyanate resin, and isothiocynate (resin). The hardening agent is a substance bonding with the gelator and enhancing the solidification of slurry. Examples of applicable gelator are polyhydric alcohol and polybasic acid.

[Gelation] The ferrite slurry is turned into gel. To do this, the ferrite slurry is allowed to standing, and waits until the slurry to gel and solidify by the reaction with the dispersion medium, the gelator, and the curing agent into the shape of the mold (cavity), thus becoming the ferrite green body. The allowing to standing is given for an approximate period of 12 hours to 2 days.

[Release] The green body is released from the mold (taken out from the mold), and is dried. The drying is given at an approximate temperature of from 100° C. to 150° C. for several hours.

[Degreasing] The dried ferrite green body is degreased. The degreasing is done at an approximate temperature of from 400° C. to 600° C. for several hours.

[Firing] The degreased ferrite green body is fired at a temperature to generate the magnetism of the intrinsic property, or at a temperature in a range from 850° C. to 1100° C. The firing can be done by a firing furnace. The temperature increase and decrease rate may be approximately 30° C./h to 70° C./h, and the calcination time may be approximately 1 to 3 hours.

[Machining] The ferrite sintered body is machined into a desired shape. For example, to use as a core of inductor, the ferrite sintered body can be machined into the core shape. The means for machining is not limited, and machining such as cutting and grinding can be given.

[Evaluation of sintered body] The inductance is determined by an LCR meter, and calculation is given to the measured inductance to determine the relative magnetic permeability.

Figure 8A:
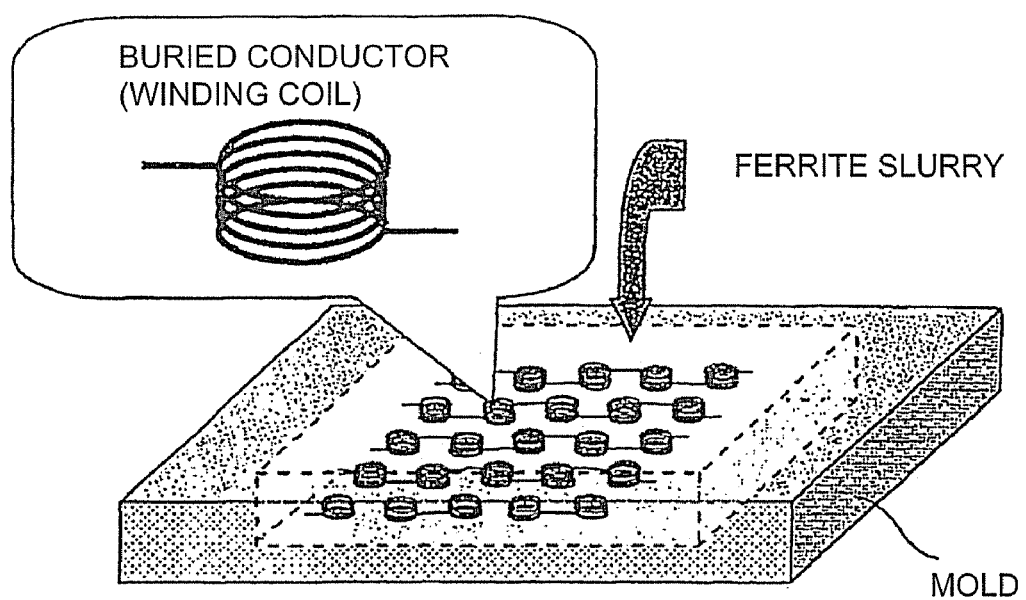
FIG. 8A is a perspective view illustrating an embodiment of the first method for producing inductor according to the present invention.

Next, the description is given on the method for producing the inductor. FIG. 8A illustrates an embodiment of the first method for producing inductor according to the present invention. The figure is a perspective view illustrating the condition in which pluralities of spiral conductor bodies (winding coils) are placed in the mold, and the ferrite slurry is poured into the mold to bury these spiral conductors.

Figure 8B:
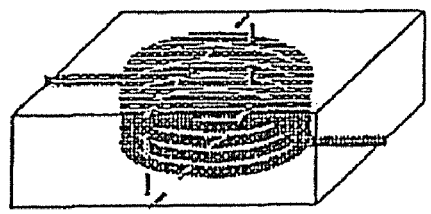
FIG. 8B is a perspective view of the inductor obtained by the first method for producing inductor according to the present invention.

First, the ferrite powder is prepared by the above method for producing ferrite powder, then the ferrite powder is used prepared the ferrite slurry. Pluralities of spiral conductors are placed in a mold on which a release agent is coated. The prepared ferrite slurry is poured into the mold to dry and to solidify around the conductor bodies. The procedure gives a ferrite green body with buried pluralities of conductors. Then, the green body is cut to each conductor fraction, and the cut piece is fired at a temperature in a range from 850° C. to 1100° C. Alternatively, the form is fired at a temperature in a range from 850° C. to 1100° C., followed by cutting into each conductor body fraction. Thus the pluralities of inductors shown in FIG. 8B are obtained.

Figure 9A:
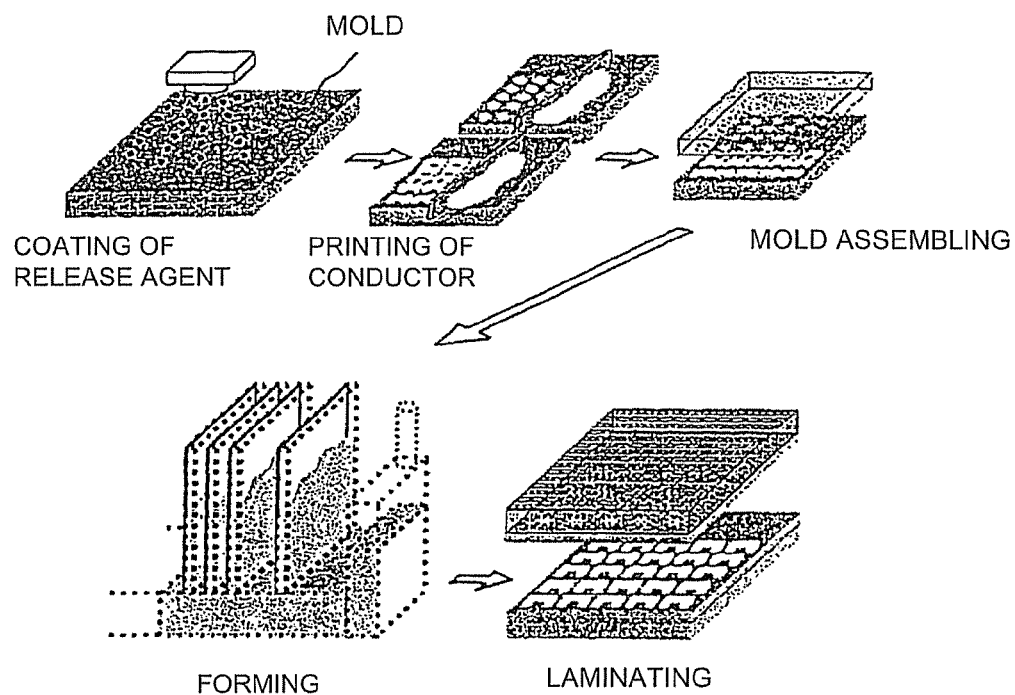
FIG. 9A illustrates the process of an embodiment of the second method for producing inductor according to the present invention.
Figure 9B:
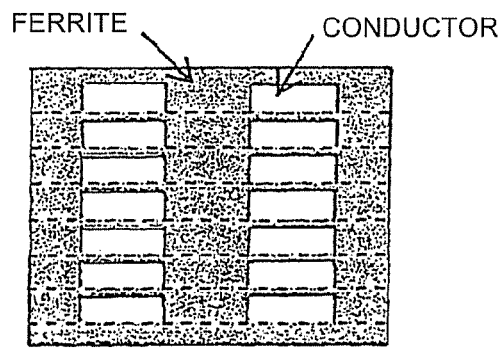
FIG. 9B shows a cross sectional view of a laminated form (an intermediate product) obtained by the second method for producing inductor according to the present invention.

FIG. 9A illustrates the process of an embodiment of the second method for producing inductor according to the present invention. In FIG. 9A, individual steps are given by the respective perspective views. FIG. 9B shows a cross sectional view of a laminated form.

Similar to the first method for producing inductor, firstly the ferrite powder is prepared by the above method for producing ferrite powder, and the ferrite powder is used and prepared the ferrite slurry. Then, the conductors (being shaped later into a spiral shape by lamination) are positioned in a mold coated with a release agent thereon by, for example, the printing method. The prepared ferrite slurry is poured, and the mold is assembled. Then, the ferrite slurry is dried and solidified around the conductors. Thus the primary green sheet of the ferrite with buried conductor bodies is obtained. By the procedure, pluralities of primary green sheets are fabricated. By stacking these pluralities of primary green sheets, the laminated green body is obtained, (refer to FIG. 9B). Within the laminated green body, pluralities of conductors are buried in spiral shape thereeach. Next, the laminated green body is cut to the individual conductor fractions, followed by firing thereof at a temperature in a range from 850° C. to 1100° C., or alternatively the laminated green body is fired at a temperature in a range from 850° C. to 110° C., followed by cutting into individual conductor fractions, thus obtaining the inductor.

EXAMPLES

The method for producing powder form according to the present invention is described below in more detail referring to the examples. The present invention, however, is not limited to these examples.

Example 1

Preparation of Ferrite Powder

Individual raw material powders were weighed: $Fe_2O_3$ (0.5 μm) to 47.6% by mole, ZnO (0.3 μm) to 27.0% by mole, NiO (1 μm) to 16.3% by mole, and CuO (2 μm) to 9.1% by mole. These powders were put in a poly container together with zirconia balls and ion-exchange water. Using the ball-mill method, wet blending of them was given for 5 hours (blending time of raw material powders on producing the ferrite powder), thus obtained the slurry. The slurry was then dried in a dryer at 100° C., followed by sieving to obtain an intermediate powder (blended raw material powder). The composition gave 830° C. of the ferrite single-phasing temperature.

Next, the intermediate powder was calcined at 700° C. (the calcination temperature on producing the ferrite powder) for 2 hours, thus obtained a calcined powder. At that time, the temperature increase and decrease rate was set to 200° C./h.

Then, thus obtained calcined powder was put in a poly container together with zirconia balls and ion-exchange water. The mixture was treated by wet milling for 24 hours (milling time of calcined powder on producing the ferrite powder), thus obtained the slurry. The slurry was dried in a dryer, followed by sieving to obtain a Ni—Zn—Cu-based ferrite powder.

The median diameter ($D_{50}$, 50% diameter) of the obtained ferrite powder was determined by a laser diffraction scattering grain size distribution tester (LA-750, HORIBA LTD.) using water as the dispersion medium. The determined median diameter was 0.8 μm. The specific surface area of the ferrite powder was determined by a specific surface area tester (Flow Sorb II 2300, Shimadzu Corporation). The determined specific surface area was 4.0 $m^2/g$ (BET).

The remanent magnetization Br per unit mass of the ferrite powder (emu/g) at 15 kOe of the maximum magnetic field was determined by a vibrating sample magnetometer VSM (BHV-525, Riken Denshi Co., Ltd.) under the condition of 15 kOe (kilo Oersted) of the maximum applying magnetic field, 5 min/loop of the sweep rate in the magnetic field, and 100 ms of the time constant. The determined Br was 0.40 emu/g.

The X-ray diffractometry was applied to the ferrite powder to determine the degree of spinel formation. The determined degree of spinel formation was 59%. The X-ray diffractometry was given by measuring the X-ray diffraction patterns in a range from 20.0° to 70.0° using the 2θ/θ method. The applied X-ray diffractometer was the one (RINT 2500) produced by Rigaku Corporation. The Cu-Kα ray was selected as the radiation source, and the graphite monochrometer was positioned in front of the detector. The condition of X-ray generation was set to 50 kV-300 mA, scanning width of 0.02°, scanning speed of 1°/min, divergence slit of 1°, scattering slit of 1°, and photo-acceptance slit of 0.3 mm.

[Preparation of ferrite slurry] The obtained ferrite powder was put in a poly container together with triacetin and dimethyl glutarate (mixture of 1:9 by mass) as the dispersion medium, and MALIALIM (product name) as the dispersant so as to give 40% by volume of the concentration of ferrite powder and to give 4.3 parts by mass of MALIALIM to the triacetin and the dimethyl glutarate. Zirconia balls were put in the poly container. The wet blending was given to the mixture by the ball-mill method at 84 rpm for 24 hours, thus obtained the ferrite slurry.

An E-type viscometer (DV-II+, The Brookfield Company) was used to determine the viscosity of the ferrite slurry at 0.3 rpm. The determined viscosity was 220 cps.

[Preparation of ferrite sintered body] To 100 parts by mass of the obtained ferrite slurry, there were blended 6.5 parts by mass of 4,4'-diphenylmethane diisocyanate as the gelator, 0.05 parts by mass of 6-dimethylamino-1-hexanol as the catalyst, and 0.38 parts by mass of ethylene glycol as the curing agent, thus obtained a slurry for gelation. The slurry was poured into a mold coated with a release agent. The teemed slurry was allowed to standing for 24 hours to obtain the ferrite green body. After that, the ferrite green body was pressed, and was taken out from the mold. The green body was then dried at 130° C. for 4 hours, and further was heated to 500° C. for 2.5 hours to degrease. Then, further the green body was fired at 900° C. for 2 hours to obtain the Ni—Zn—Cu-based ferrite sintered body. At that time, the temperature increase and decrease rate was set to 50° C./h. Thus obtained ferrite sintered body was machined into a toroidal core shape having 16.5 mm in outer diameter, 5 mm in inner diameter, and 4.2 mm in height.

Using an LCR meter (4285A, Agilent Technologies Inc., with an electrode 16454A for measuring magnetic material), the machined ferrite sintered body was tested to determine the inductance at 1 MHz, from which inductance the relative magnetic permeability was calculated to obtain the value of 200.

Table 1 shows the result of Example 1, giving the calcination temperature on producing the ferrite powder, the median diameter of the ferrite powder, the specific surface area of the ferrite slurry, the degree of spinel formation of the ferrite powder, the remanent magnetization of the ferrite sinter, the viscosity of the ferrite slurry and the evaluation thereof, the relative magnetic permeability of the ferrite sintered body and the evaluation thereof, and the total evaluation.

The evaluation of the viscosity of ferrite slurry was given to the case of producing inductor and the like, expressing by: the symbol ⊚ for 1000 cps or smaller, sufficiently low viscosity as the slurry being poured into a mold having a precise pattern of micron order; the symbol ○ for larger than 1000 cps and not larger than 3000 cps, a viscosity capable of being poured into the mold; and the symbol X for larger than 3000 cps, a viscosity being not possible to pour into the mold. Regarding the evaluation of the relative magnetic permeability of the ferrite sintered body, when a ferrite single-phased powder was press-formed, and was fired at 900° C. for 2 hours, the relative magnetic permeability was 250. Accordingly, the value of 250 was adopted as the typical value for the ferrite single phase composition. The evaluation was given by the symbol ⊚ for 225 (90% of the typical value) or larger relative magnetic permeability, the symbol ○ for 200 (80% of the typical value) or larger and smaller than 225, and the symbol X for smaller than 200. The total evaluation was given as the symbol ⊚ if both the viscosity and the relative magnetic permeability were evaluated to ⊚, the symbol ○ if any one thereof was evaluated to ○, and the symbol X if any one thereof was evaluated to X.

TABLE 1

| | Calcination temperature (° C.) | Median diameter (μm) | Specific surface area (m²/g) | Degree of spinel formation (%) | Remanent magnetization Br (emu/g) | Slurry viscosity (cps) | Evaluation | Relative magnetic permeability of sinter | Evaluation | Total evaluation |
|---|---|---|---|---|---|---|---|---|---|---|
| Comparative Example 1 | 750 | 3.0 | 1.0 | 90 | 1.79 | 50 | ⊚ | 160 | X | X |
| Example 1 | 700 | 0.8 | 4.0 | 59 | 0.40 | 220 | ⊚ | 200 | ○ | ○ |
| Example 2 | 760 | 0.8 | 4.0 | 77 | 1.00 | 320 | ⊚ | 230 | ⊚ | ⊚ |
| Example 3 | 780 | 0.8 | 4.0 | 85 | 3.90 | 920 | ⊚ | 240 | ⊚ | ⊚ |
| Example 4 | 800 | 0.8 | 4.0 | 90 | 5.50 | 2800 | ○ | 240 | ⊚ | ○ |
| Comparative Example 2 | 600 | 0.5 | 5.0 | 33 | 0.03 | 70 | ⊚ | 160 | X | X |
| Example 5 | 630 | 0.5 | 5.0 | 45 | 0.05 | 100 | ⊚ | 200 | ○ | ○ |
| Example 6 | 650 | 0.5 | 5.0 | 48 | 0.08 | 110 | ⊚ | 200 | ○ | ○ |
| Example 7 | 700 | 0.5 | 5.0 | 65 | 0.72 | 250 | ⊚ | 230 | ⊚ | ⊚ |
| Example 8 | 750 | 0.5 | 5.0 | 69 | 1.47 | 420 | ⊚ | 230 | ⊚ | ⊚ |
| Example 9 | 760 | 0.5 | 5.0 | 72 | 1.63 | 500 | ⊚ | 230 | ⊚ | ⊚ |
| Example 10 | 780 | 0.5 | 5.0 | 85 | 2.92 | 800 | ⊚ | 230 | ⊚ | ⊚ |
| Example 11 | 800 | 0.5 | 5.0 | 90 | 4.80 | 2930 | ○ | 230 | ⊚ | ○ |
| Comparative Example 3 | 810 | 0.5 | 5.0 | 95 | 5.24 | 4200 | X | 240 | ⊚ | X |
| Comparative Example 4 | 830 | 0.5 | 5.0 | 100 | 8.49 | >20000 | X | 240 | ⊚ | X |
| Comparative Example 5 | 600 | 0.3 | 9.0 | 31 | 0.03 | 100 | ⊚ | 120 | X | X |
| Example 12 | 650 | 0.3 | 9.0 | 51 | 0.12 | 210 | ⊚ | 210 | ○ | ○ |
| Example 13 | 700 | 0.3 | 9.0 | 64 | 0.50 | 390 | ⊚ | 230 | ⊚ | ⊚ |

TABLE 1-continued

| | Calcination temperature (° C.) | Median diameter (μm) | Specific surface area (m²/g) | Degree of spinel formation (%) | Remanent magnetization Br (emu/g) | Slurry viscosity (cps) | Slurry Evaluation | Relative magnetic permeability of sinter | Relative magnetic permeability Evaluation | Total evaluation |
|---|---|---|---|---|---|---|---|---|---|---|
| Comparative Example 6 | 810 | 0.3 | 9.0 | 98 | 7.80 | >20000 | X | 240 | ⊚ | X |
| Example 14 | 650 | 0.3 | 9.0 | 46 | 0.10 | 140 | ⊚ | 210 | ○ | ○ |
| Example 15 | 700 | 0.3 | 9.0 | 65 | 0.90 | 420 | ⊚ | 230 | ⊚ | ⊚ |
| Example 16 | 750 | 0.3 | 9.0 | 71 | 1.89 | 950 | ⊚ | 240 | ⊚ | ⊚ |
| Example 17 | 760 | 0.3 | 9.0 | 72 | 2.94 | 1440 | ○ | 250 | ⊚ | ○ |
| Example 18 | 770 | 0.3 | 9.0 | 80 | 4.00 | 2990 | ○ | 250 | ⊚ | ○ |
| Comparative Example 7 | 650 | 0.3 | 9.0 | 35 | 0.09 | 280 | ⊚ | 180 | X | X |
| Example 19 | 700 | 0.3 | 9.0 | 60 | 1.20 | 610 | ⊚ | 230 | ⊚ | ⊚ |
| Example 20 | 750 | 0.3 | 9.0 | 66 | 2.18 | 980 | ⊚ | 250 | ⊚ | ⊚ |
| Comparative Example 8 | 850 | 0.3 | 9.0 | 100 | 10.30 | >20000 | X | 250 | ⊚ | X |
| Comparative Example 9 | 600 | 0.2 | 11.0 | 28 | 0.04 | 230 | ⊚ | 160 | X | X |
| Example 21 | 650 | 0.2 | 11.0 | 45 | 0.13 | 310 | ⊚ | 210 | ○ | ○ |
| Example 22 | 700 | 0.2 | 11.0 | 62 | 1.25 | 830 | ⊚ | 230 | ⊚ | ⊚ |
| Example 23 | 750 | 0.2 | 11.0 | 73 | 1.99 | 1320 | ○ | 240 | ⊚ | ○ |
| Example 24 | 760 | 0.2 | 11.0 | 75 | 3.00 | 2980 | ○ | 240 | ⊚ | ○ |
| Comparative Example 10 | 780 | 0.2 | 11.0 | 87 | 6.00 | >20000 | X | 250 | ⊚ | X |
| Comparative Example 11 | 810 | 0.2 | 11.0 | 96 | 8.00 | >20000 | X | 250 | ⊚ | X |
| Comparative Example 12 | 830 | 0.2 | 11.0 | 100 | 9.01 | >20000 | X | 250 | ⊚ | X |
| Example 25 | 650 | 0.1 | 14.0 | 45 | 0.05 | 950 | ⊚ | 220 | ○ | ○ |
| Comparative Example 13 | 650 | 0.05 | 30.0 | 38 | 0.05 | 3400 | X | 230 | ⊚ | X |
| Comparative Example 14 | 650 | 0.5 | 5.0 | 38 | 0.03 | 80 | ⊚ | 100 | X | X |
| Example 26 | 690 | 0.5 | 5.0 | 48 | 0.06 | 110 | ⊚ | 150 | ○ | ○ |
| Example 27 | 760 | 0.5 | 5.0 | 65 | 1.02 | 310 | ⊚ | 165 | ⊚ | ⊚ |
| Example 28 | 840 | 0.5 | 5.0 | 85 | 2.88 | 780 | ⊚ | 170 | ⊚ | ⊚ |
| Example 29 | 860 | 0.5 | 5.0 | 90 | 4.98 | 2700 | ○ | 175 | ⊚ | ○ |
| Comparative Example 15 | 890 | 0.5 | 5.0 | 100 | 8.87 | >20000 | X | 180 | ⊚ | X |

Examples 2 to 25, Comparative Examples 1 to 13

There were varied the median diameter and the specific surface area, the degree of spinel formation, and the remanent magnetization of ferrite powder through the adjustment of calcination temperature on producing the ferrite powder, and the mixing time of raw material powders and the milling time of calcined powder on producing the ferrite powder. In addition, similar to Example 1, there were prepared and evaluated the Ni—Zn—Cu-based ferrite powder, the ferrite slurry, and the ferrite sintered body. The specific surface area of mixed powder after mixing was in a range from 3.5 to 6.0 m²/g, and the specific surface area of milled powder after milling was in a range from 2.5 to 5.5 m²/g.

Figure 5A:
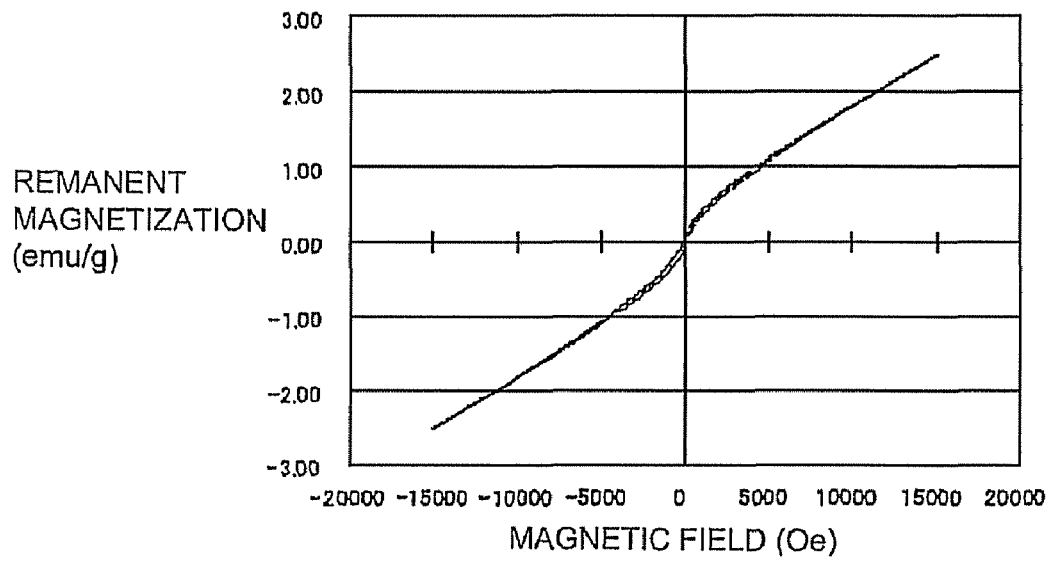
FIG. 5A is a graph showing the relationship between the magnetic field and the magnetization (quantity) in an example (Example 6).
Figure 5B:
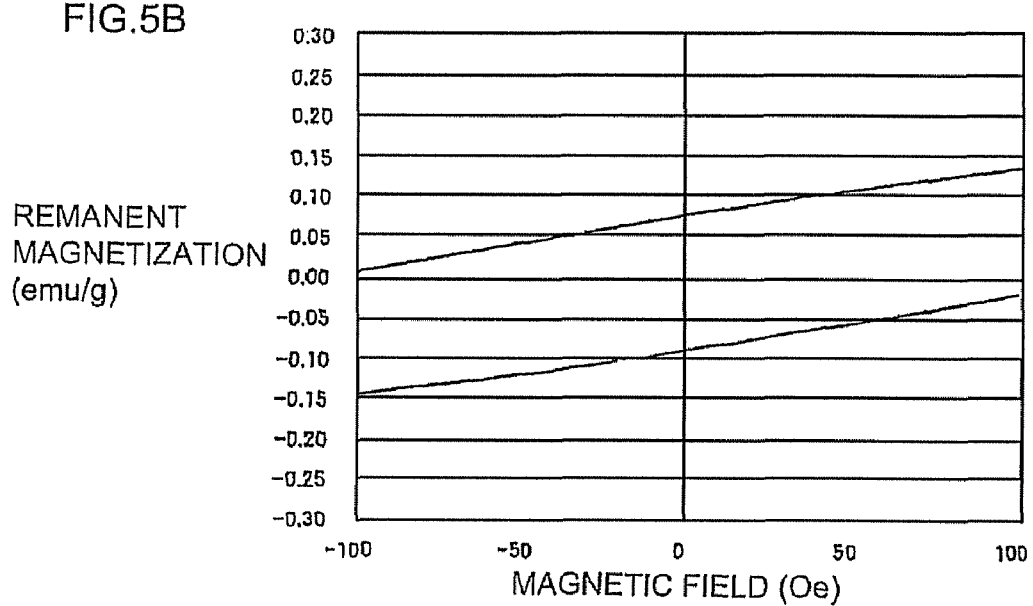
FIG. 5B is a graph enlarging near the original point of FIG. 5A.
Figure 6A:
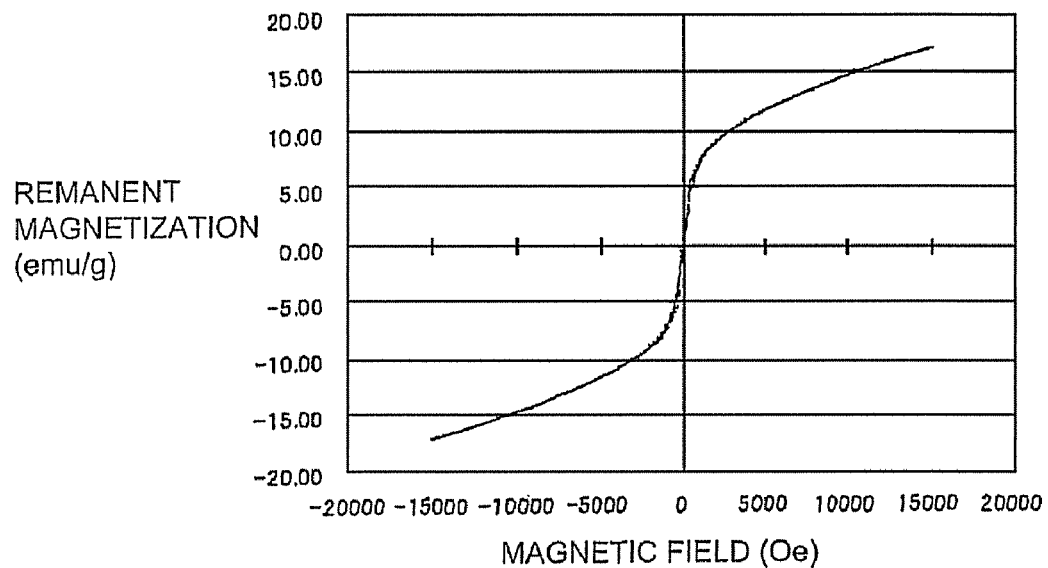
FIG. 6A is a graph showing the relationship between the magnetic field and the magnetization (quantity) in an example (Example 8).
Figure 6B:
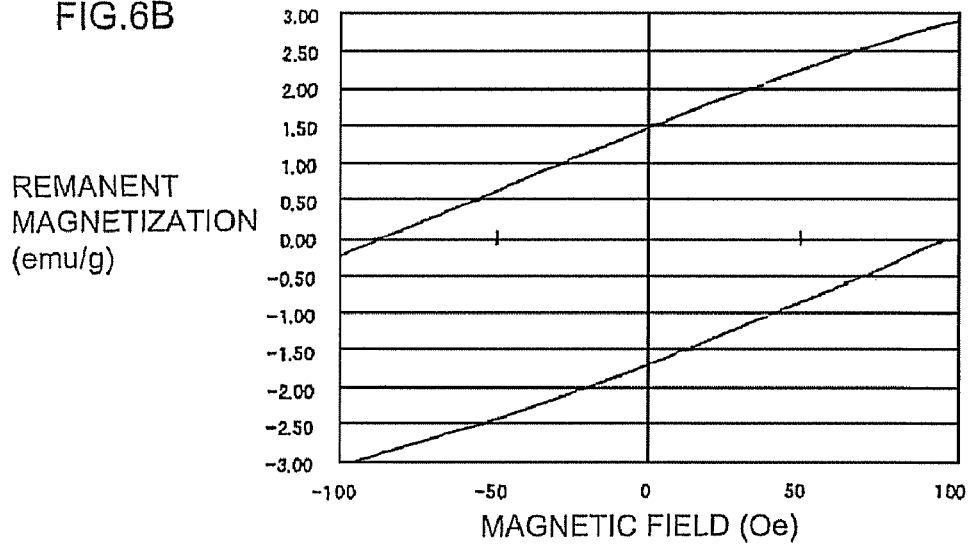
FIG. 6B is a graph enlarging near the original point of FIG. 6A.
Figure 7A:
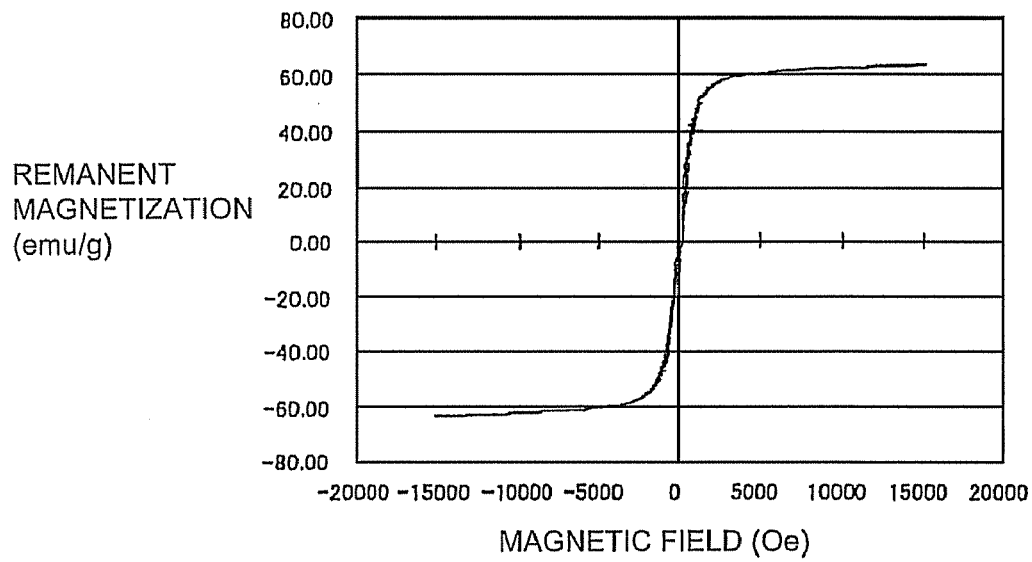
FIG. 7A is a graph showing the relationship between the magnetic field and the magnetization (quantity) in an example (Comparative Example 4).
Figure 7B:
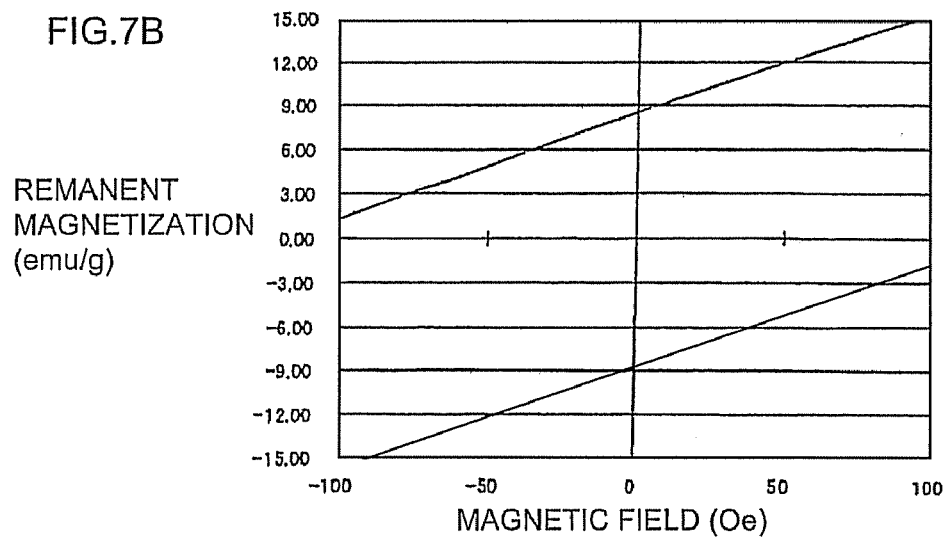
FIG. 7B is a graph enlarging near the original point of FIG. 7A.

Table 1 shows the result of similar articles to those in Example 1. The evaluation criteria for Examples 2 to 25 and Comparative Examples 1 to 13 were the same to those of Example 1. For Example 6, Example 8, and Comparative Example 4, the remanent magnetization per unit mass (emu/g) was determined using a vibrating sample magnetometer VSM (BHV-525, Riken Denshi Co., Ltd.) under the condition of 15 kOe (kilo Oersted) of the maximum applying magnetic field, 5 min/loop of the sweep rate in the magnetic field, and 100 ms of the time constant. The relationship between the magnetic field and the magnetization (quantity) is given in FIG. 5A and FIG. 5B (Example 6), FIG. 6A and FIG. 6B (Example 8), and FIG. 7A and FIG. 7B (Comparative Example 4).

Figure 10:
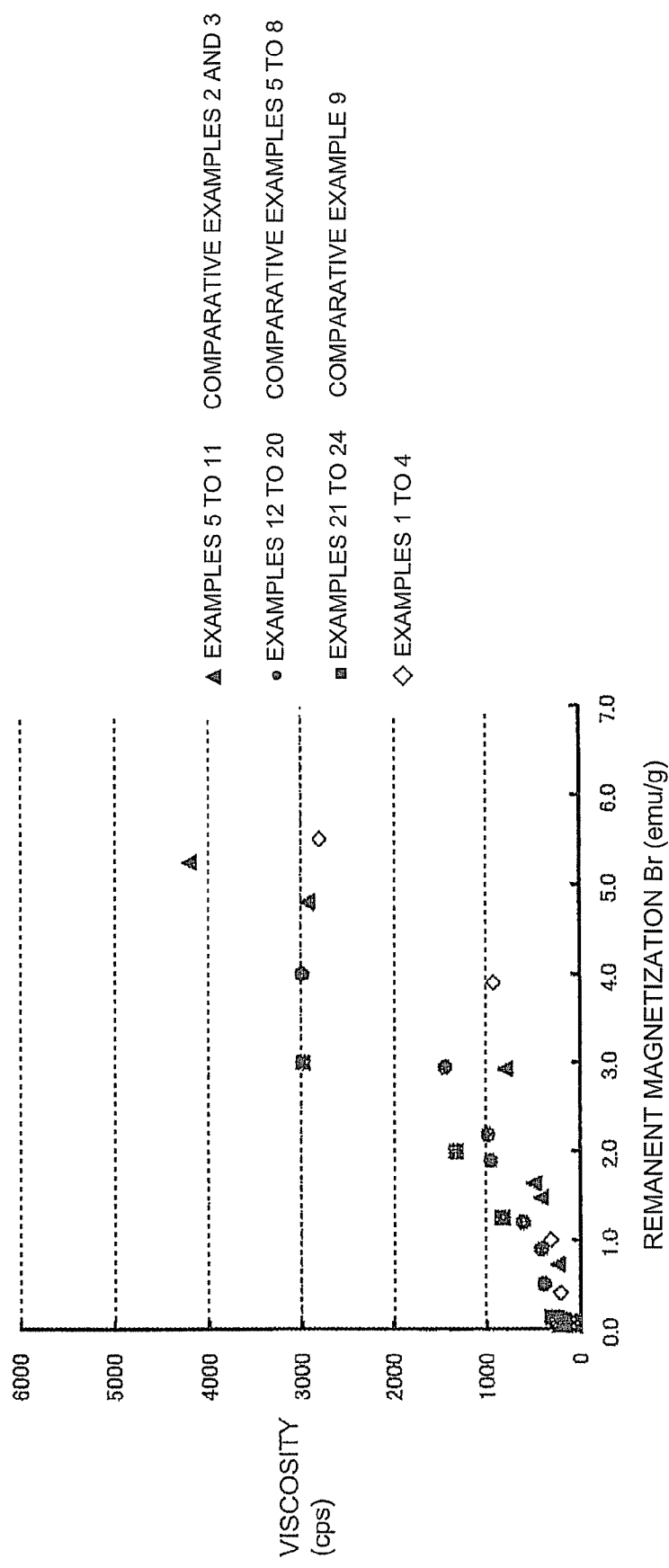
FIG. 10 is a graph showing the result of examples, giving the relationship between the remanent magnetization Br of ferrite powder and the viscosity of ferrite slurry prepared by using the ferrite powder, for the respective median diameters and the specific surface areas of the ferrite powder.

FIG. 10 shows the relationship between the remanent magnetization Br of ferrite powder and the viscosity of ferrite slurry for the respective median diameters $D_{50}$ and the specific surface areas of the ferrite powder, based on the results of Examples 1 to 25 and Comparative Examples 1 to 13 given in Table 1. FIG. 10 shows that the same median diameter and specific surface area gives a certain relationship between the remanent magnetization and the viscosity. In FIG. 10, as given in Table 1, Examples 1 to 4 are for 0.8 μm of median diameter and 4.0 m²/g of specific surface area, Examples 5 to 11 and Comparative Examples 2 and 3 are for 0.5 μm and 5.0 m²/g, respectively, Examples 12 to 20 and Comparative Examples 5 to 8 are for 0.3 μm and 9.0 m²/g, respectively, and Examples 21 to 24 and Comparative Example 9 are for 0.2 μm and 11.0 m²/g, respectively.

Figure 11:
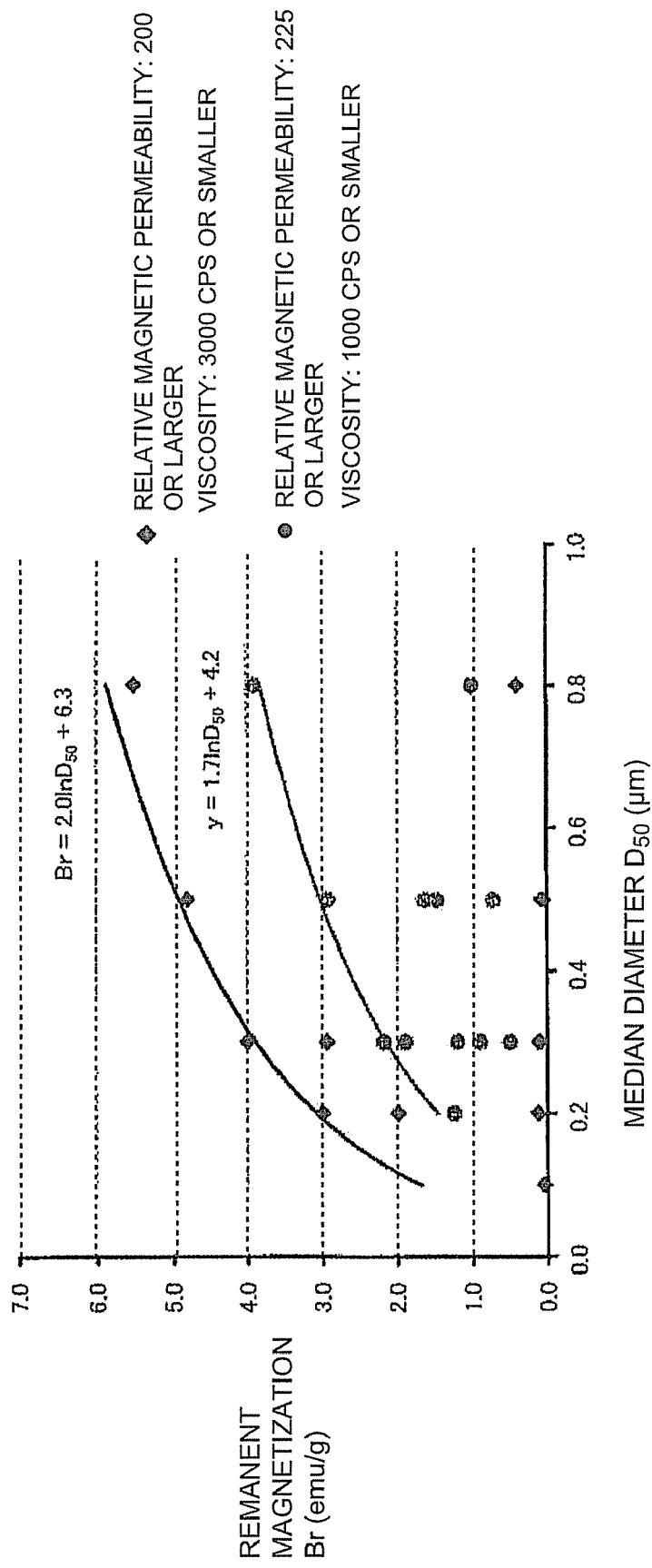
FIG. 11 is a graph showing the result of examples, giving the relationship between the median diameter $D_{50}$ and the remanent magnetization Br of ferrite powder, for the respective viscosities of ferrite slurry prepared by using the ferrite powder and for the respective relative magnetic permeabilities of ferrite sinter obtained from the ferrite slurry.
Figure 12:
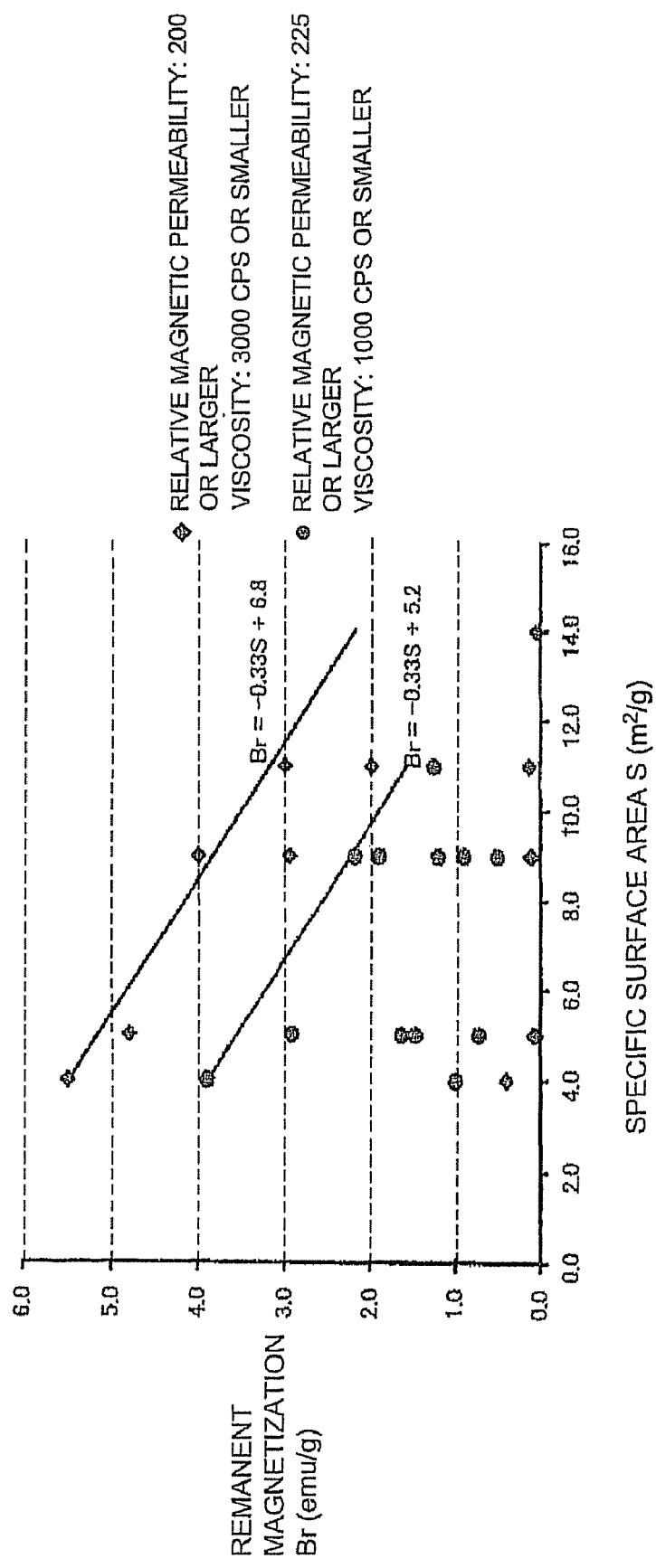
FIG. 12 is a graph showing the result of examples, giving the relationship between the specific surface area S and the remanent magnetization Br of ferrite powder, for the respective viscosities of ferrite slurry prepared by using the ferrite powder and for the respective relative magnetic permeabilities of ferrite sinter obtained from the ferrite slurry.

FIG. 11 shows the relationship between the median diameter $D_{50}$ and the remanent magnetization Br of ferrite powder for the respective relative magnetic permeabilities of ferrite sintered body and for the respective viscosities of ferrite slurry, based on the results of Examples 1 to 25 and Comparative Examples 1 to 13 given in Table 1. Similarly, FIG. 12 shows the relationship between the specific surface area S and the remanent magnetization Br of ferrite powder for the respective relative magnetic permeabilities of ferrite sintered body and for the respective viscosities of ferrite slurry, based on the results of Examples 1 to 25 and Comparative Examples 1 to 13 given in Table 1. In FIG. 11 and FIG. 12, the case of the relative magnetic permeability of 200 or larger and the viscosity of 3000 or smaller gives the evaluation of ○, and the case of the relative magnetic permeability of 225 or larger and the viscosity of 1000 or smaller gives the evaluation of ⊚. There are given two equations in FIG. 11 and FIG. 12. These two equations signify the respective critical limits for the respective cases of evaluation ○ and ⊚.

Examples 26 to 29, Comparative Examples 14 and 15

On producing the ferrite powder, a Ni—Zn-based ferrite powder was prepared by weighing: $Fe_2O_3$ (0.5 μm) to 46.7% by mole, ZnO (0.3 μm) to 36.0% by mole, and NiO (1 μm) to 17.3% by mole. The ferrite single-phasing temperature at that composition was 890° C. The calcination temperature on producing the ferrite powder was varied. Other variables were the same to those in Example 1, thus prepared the Ni—Zn-based ferrite powder, the ferrite slurry, and the ferrite sintered body.

Table 1 shows the results on the same articles to those in Example 1. The evaluation criteria for the viscosity of ferrite slurry in Examples 26 to 29 and Comparative Examples 14 and 15 were the same to those in Example 1. However, for the evaluation of the relative magnetic permeability of ferrite sintered body having different composition, since the relative magnetic permeability was 180 when a ferrite single-phased powder was press-formed, followed by firing at 1050° C. for 2 hours, the value of 180 was adopted as the typical value of the ferrite single phase composition. The evaluation was given by the symbol ⊚ for 162 (90% of the typical value) or larger relative magnetic permeability, the symbol ○ for 144 (80% of the typical value) or larger and smaller than 162, and the symbol X for smaller than 144.

(Consideration) The results given in Table 1 and FIG. 11 derived that the viscosity of ferrite slurry reaches a level allowing pouring (3000 cps or smaller) if the median diameter $D_{50}$ [μm] of the ferrite powder is in a range from 0.1 to 0.8 μm, the degree of spinel formation is in a range from 45 to 90%, and the remanent magnetization Br per unit mass [emu/g] after 15 kOe of the applied maximum magnetic field satisfies the formula $[0.05 \leq Br \leq 2.0(\ln.D_{50})+6.3]$, and further confirmed that ferrite intrinsic magnetism (relative magnetic permeability) is actualized when the relative magnetic permeability of the formed and fired ferrite sintered body reaches 80% or larger value of the typical value of the ferrite single phase composition.

Furthermore, it was found that the viscosity of ferrite slurry becomes favorable level (1000 cps or smaller) allowing teeming when the remanent magnetization Br [emu/g] satisfies the formula $[0.50 \leq Br \leq 1.7 (\ln.D_{50})+4.2]$, and further confirmed that ferrite intrinsic magnetism (relative magnetic permeability) is actualized when the relative magnetic permeability of the formed and fired ferrite sintered body reaches 90% or larger value of the typical value of the ferrite single phase composition.

The relative density was determined on the machined ferrite sintered body, and there was observed a correlation giving 95% or larger relative density in the case of ⊚ evaluation of the relative magnetic permeability, and 90% or larger thereof in the case of ○ evaluation thereof.

The ferrite powder according to the present invention can be used as the powder raw material for producing ferrite sintered body through the forming stage based on gel casting. In particular, the ferrite powder of the present invention is suitably used on producing inductor (when the ferrite sintered body is inductor).

What is claimed is:

1. A Ni—Zn—Cu based ferrite powder or a Ni—Zn based ferrite powder having a median diameter $D_{50}$ [μm] in a range from 0.1 to 0.8 μm, a degree of spinel formation in a range from 60% or more to 71% or less, and a remanent magnetization Br per unit mass [emu/g] satisfying the following formula after application of maximum magnetic field of 15 kOe: $0.05 \leq Br \leq 2.0(\ln.D_{50})+6.3$.

2. The Ni—Zn—Cu based ferrite powder or Ni—Zn based ferrite powder according to claim 1, wherein said remanent magnetization Br [emu/g] satisfies the formula $0.50 \leq Br \leq 1.7(1n.D_{50})+4.2$.

3. A method for producing an inductor comprising the steps of: placing a spiral conductor in a mold; preparing ferrite powder using the method for producing ferrite powder according to claim 1; preparing a ferrite slurry using and processing the ferrite powder; pouring the ferrite slurry into said mold; solidifying the poured ferrite slurry around said conductor to obtain a green body; and firing the green body at a temperature ranging from 850° C. to 1100° C.

4. A method for producing an inductor comprising the steps of: placing a conductor in a mold; preparing ferrite powder using the method for producing ferrite powder according to claim 1; preparing a ferrite slurry using and processing the ferrite powder; pouring the ferrite slurry into said mold; solidifying the poured ferrite slurry around said conductor to obtain pluralities of primary green sheets; laminating these pluralities of primary green sheets together to obtain a laminated green body with said conductor buried therein in a spiral shape; and firing the laminated green body at a temperature ranging from 850° C. to 1100° C.

* * * * *